United States Patent [19]
Colmey et al.

[11] 3,911,143
[45] Oct. 7, 1975

[54] SUBSTITUTE PRODUCT FOR NONFAT DRY MILK AND METHOD FOR FORMING

[75] Inventors: John C. Colmey, Danville; Marlene R. Henselman, Pleasanton, both of Calif.

[73] Assignee: Foremost-McKesson, Inc., San Francisco, Calif.

[22] Filed: Aug. 20, 1970

[21] Appl. No.: 65,535

[52] U.S. Cl. ............... 426/583; 426/588; 426/656
[51] Int. Cl. .................................. A23c 21/00
[58] Field of Search ........................... 99/57, 63

[56] References Cited
UNITED STATES PATENTS

| | | | |
|---|---|---|---|
| 2,123,203 | 7/1938 | Riggs | 99/57 |
| 2,467,453 | 4/1949 | Almy | 99/57 |
| 2,555,514 | 6/1951 | Sharp | 99/57 |
| 2,602,747 | 7/1952 | Meade | 99/57 |
| 2,716,063 | 8/1955 | Shearer | 99/57 |
| 3,061,442 | 10/1962 | Ward | 99/57 |

*Primary Examiner*—S. Leon Bashore
*Assistant Examiner*—Frederick Frei
*Attorney, Agent, or Firm*—David J. Brezner

[57] ABSTRACT

A method for forming a substitute for nonfat milk in such uses as a dough additive for baked products. The method includes the treatment of aqueous whey, preferably in concentrate form, with calcium hydroxide to form a whey buffer complex capable of controlled release of dissociated calcium ions. Thereafter, casein is added to react with the calcium and form a stable dispersion of calcium caseinate throughout the whey and to form a complex product. This complex may be further reacted with sodium phosphate to form another product with calcium phosphate bridges in the complex. Either product may be dry blended with sodium caseinate to increase the overall protein content, if desired for a particular function as a nonfat milk substitute.

20 Claims, 1 Drawing Figure

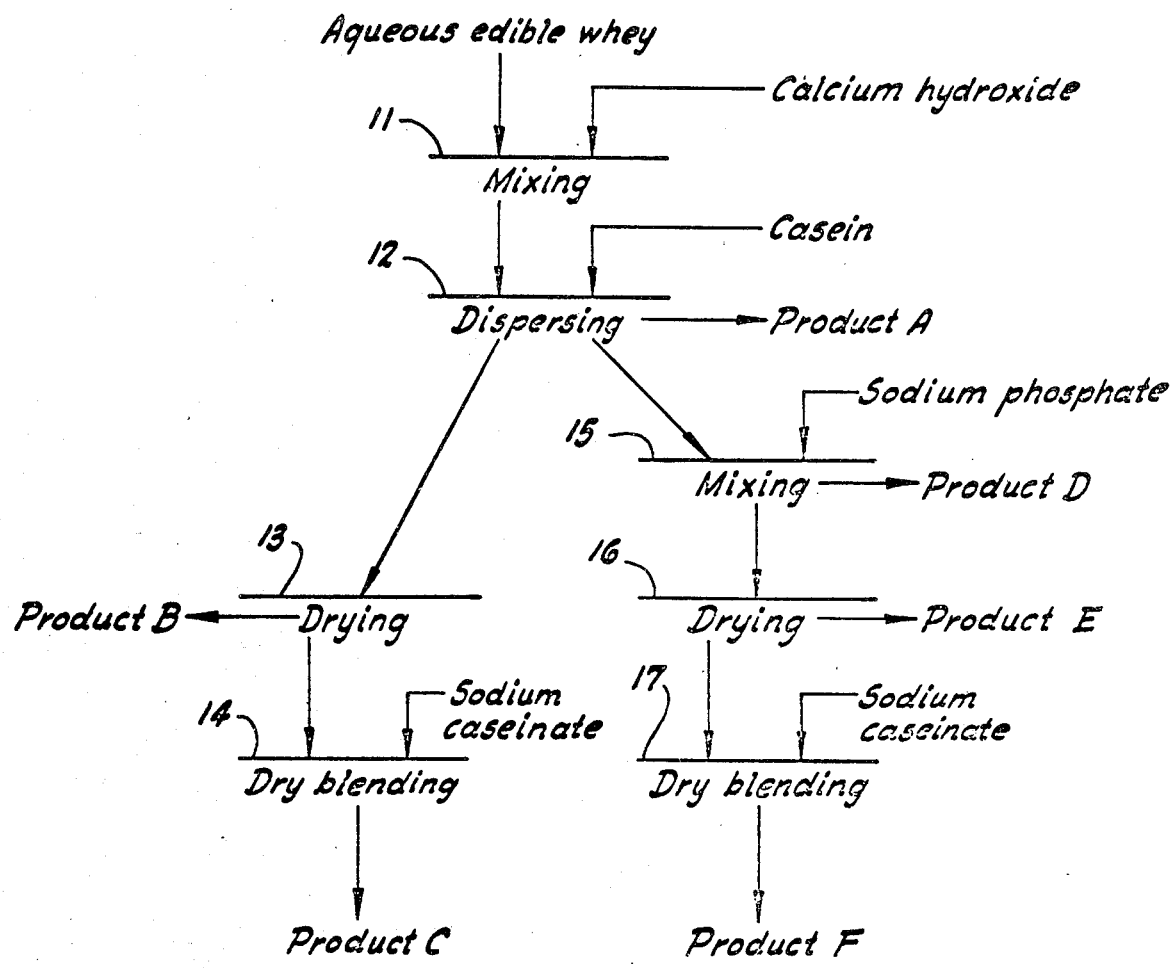

SUBSTITUTE PRODUCT FOR NONFAT DRY MILK AND METHOD FOR FORMING

BACKGROUND OF THE INVENTION

Nonfat milk includes a whey fraction, high in lactose and low in protein, and a casein protein fraction. According to the prevailing theory, the casein exists in milk as a complex in which a number of protein groups are interlinked by calcium and calcium phosphate bridges. The nonfat milk, in dry or slurry form, is employed in large quantities as a dough additive in the formation of baked products such as bread. It interacts with the dough protein to facilitate manipulation of the dough and improve structural and other characteristics of the baked loaf. For example, it imparts improvements in the following: crust color, break and shred, grain and texture. Furthermore, the flavor is richer and the load volume may be increased. The milk proteins contribute to absorption and structure by complexing with the wheat protein portion of the dough to provide additional strength. The whey portion provides a tenderizing function. (Nonfat milk as a 100–130% absorption —i.e., it absorbs 1.00–1.30 lbs of water/lg.) Only nonfat milk heat treated at an alkaline pH functions in this manner. It is believed that the heat treatment causes a complexing between the protein in the whey and casein fractions of the nonfat milk and that only this form can effectively modify the dough.

Nonfat milk is also used as a cake or doughnut mix additive to provide the above advantages. In addition, it is used as an additive for product stability in margarine and for flavoring and nutrition in powders of the so-called "instant breakfast" type.

It has been attempted to substitute edible whey, an inexpensive byproduct in the formation of curds for cheeses (e.g., cheddar or Swiss), for nonfat milk as a dough additive. However, whey lacks the requisite amount of protein for structural strength of the dough and so produces slack, sticky and wet doughs and a bread load exhibiting coarse grain and weak outside walls.

To supply the structure building property lacking in the whey, a blend of whey and free casein, having a high protein content, has been used as a dough additive. Free casein, by definition, is that protein prepared by precipitation from nonfat milk by acidification to a pH of 4.6 to 4.7 (its isoelectric point). Free casein is insoluble and poorly dispersible in water and so is normally reacted with sodium hydroxide to form water soluble sodium caseinate to facilitate its use as a readily dispersible, high protein dough additive. The casein complex in milk is disrupted during acid precipitation and is further modified by the formation of sodium caseinate. Dry blends of the sodium caseinate with whey have not proven to have the aforementioned functional properties of nonfat milk in baked products. The most logical explanation for this is that the disrupted protein in the free casein cannot function in the manner of the aforementioned casein complex in nonfat milk. Furthermore, the whey-casein complexing that occurs during heat treatment of nonfat milk (which improves its functioning) would not occur in a dry blend, even by applying heat.

Flavor is another problem with the whey and caseinate blend. A large quantity of caseinate is required to be blended with the whey to increase the protein content to that of nonfat milk either to duplicate its nutritional composition or in an attempt to duplicate its function. The correspondingly large quantities of sodium groups in the salt form have been found to give a distinct "chalky" off-flavor, especially detrimental when the blend is used for flavoring or in large proportions for nutritional value and flavor as in "instant breakfasts".

SUMMARY OF THE INVENTION AND OBJECTS

This invention relates generally to a substitute product for nonfat milk which is similar in function and taste and to a process for forming the substitute from whey and casein. A particular application of the product is as an additive for baked products.

It is a general object of the invention to provide an improved substitute product for nonfat milk and a process for forming the same.

It is a further object of the invention to produce a substitute product which is similar in function and taste to nonfat milk and which is vastly superior to substitute products of the aforementioned type.

It is a particular object of the invention to provide a substitute product suitable for replacing nonfat milk as an additive in the formation of baked products.

In accordance with the above objects, a substitute for nonfat milk is prepared by mixing an aqueous, edible whey concentrate with an amount of calcium hydroxide sufficient to form a whey buffer complex at an alkaline pH. Calcium is uniformly distributed in the whey in complex form capable of controlled release of dissociated calcium ions to yield a low ion concentration. Thereafter, casein is added and dispersed thoroughly into the whey buffer complex using agitation to form a stable dispersion of calcium caseinate distributed throughout the whey and to cause a substantial portion of the caseinate to complex with the whey through calcium bridges. In contrast, if the calcium hydroxide and casein were added simultaneously, a thick gel which is difficult to process would develop. It is believed that the process of the invention yields a stable dispersion because the buffered dispersed state of the calcium ion prevents a rapid reaction between the casein and calcium which would occur with high concentration of dissociated calcium ions. Dispersion stability is also believed to be the result of retaining the caseinate in spaced-apart relationship by means of calcium bridges linking portions of caseinate and whey throughout the dispersion. This product, hereinafter denoted as product A, may be used as a dough additive in this slurry form or it may be dried into a powder (hereinafter product B) for this purpose. In either form it is similar in function to heat-treated nonfat milk.

In further processing, phosphate ion may be introduced to the stable dispersion of product A to form a complex network having calcium and calcium phosphate bridges between portions of the whey and caseinate, hereinafter denoted product D. The complex of a suitable product includes between 0.25 and 1.0% by weight calcium, and between 0.1% by weight calcium, and between 0.1% and 0.4% by weight sodium. The pH of product D is adjusted to be between 6.0 and 7.2 to closely approximate nonfat milk. Slurry product D, or its dry form, product E, are particularly effective as additives in a doughnut mix to provide the proper amount of volumetric expansion of the final doughnut product in a similar manner to nonfat milk additive but vastly superior to a dry mix of whey and caseinate. This indicates that the structure of product B is more like that of nonfat milk than of a dry blend of whey and caseinate.

For economy, casein in dry form is to be blended into the whey dispersion to form a dry powder of either product A or B, only so much casein should be blended as is functionally necessary. This is because of the expense of redrying the casein and also because of the high viscosities that are produced when the whey is in the preferred highly-concentrated condition. Thus the protein content of either product A or B, when using a conventional low-protein whey, would only be increased to values on the order of 20% when adding about 10% of casein to the whey based on the total solids content of the thus-formed dispersion.

For uses where it is important that the additive have a protein content on the order of nonfat milk (30–35%) either product B or E may be blended with sodium caseinate in proper proportions for this purpose. These blends, hereinafter products C and F, respectively, have been found to be superior to products B or E for performing the function of water binding. This apparently indicates it is only necessary that a certain minimum amount of the whey and casein protein to be in a complex form in order to function in the manner of heat-treated nonfat milk. Also, it is noted that in products C or F only 20% of the sodium is in the caseinate form and so the product has a flavoring much closer to that of nonfat milk than of a blend of whey and sodium caseinate in which about 30% would be in the caseinate form to increase the protein content to that of nonfat milk. This is particularly important where products C or F would be used in large proportions where flavoring would be more noticeable, as in "instant breakfasts".

Other and further objects of the invention will be more apparent from the following description taken in conjunction with the appended drawing.

Brief Description of the Drawing

The single figure is a flow sheet illustrating a method for forming substitute products for nonfat milk in accordance with the present invention.

Description of the Preferred Embodiments

Referring to step 11 of the drawing, aqueous edible whey is mixed with calcium hydroxide in proportions to form a dispersion. The dispersion is preferably at an alkaline pH (above 7.5) to facilitate uniform distribution of casein, but not at a pH above 9 to avoid decomposition of the components of the whey. To further assist the dispersion of casein which is slightly insoluble in cold fluid, the mixing temperature should be at least 65°F and preferably from 75° to 110°F. Under these conditions, it is believed that the calcium complexes with the whey to form a buffer complex capable of controlled release of dissociated calcium ions. By introducing an amount of calcium hydroxide slightly in excess of the amount necessary for the formation of this complex, the dissociated calcium ion concentration is maintained at a low level for proper reaction with casein as explained with respect to step 12. For this purpose, good results are obtained by mixing 0.5 and 1%, preferably about 0.7 to 0.8% of the calcium hydroxide with the whey based on total solids content, although higher amounts may be used.

The edible whey provided in step 11 may be of any conventional type, e.g., a byproduct fluid remaining after coagulation of casein from whole milk by rennet for sweet cheese-making or from nonfat milk by acidification for production of cottage cheese.

Such whey has a lactose content averaging about 68% (dry solids basis) and a whey protein content averaging about 12%. For certain purposes, it may be desired to employ a partially delactosed whey which may have a lactose content of from 40 to 60%. Such a product has a higher whey protein content (e.g, 15 to 45%). The whey may also be of the demineralized type which has been processed to reduce its ash content (e.g., by ion exchange resins or electrodialysis). In some instances the whey may be both partially delactosed and demineralized, as for example by the process of Francis U.S. Pat. No. 3,447,930. Generally it is desirable to pasteurize the whey as by heating to a temperature range of from 161° to 220°F. and holding for a period ranging inversely from 5 to 16 seconds.

For any type of whey, it is most economical to preconcentrate prior to use in the process, especially when as is typical, the final product is spray dried to a powdered form for shipment. It is obvious that concentrating the whey reduces the cost of the spray drying step. However, there is a practical maximum solids concentration above which the viscosity of the dispersion becomes so high that it is extremely difficult to uniformly disperse casein. A whey solids content of between 25% and 55% falls within these two practical extremes while a preferred concentration is from 38–42%. Fluid whey may be effectively concentrated to such solids content by evaporation followed by crystallization.

In step 12, casein is thoroughly dispersed in the buffer complex of step 11 to form a homogeneous mixture. This is preferably performed under agitated conditions for an extended period of time (e.g., from ¼ to ¾ hours). In this manner, the calcium complexed throughout the whey reacts with the casein to form calcium caseinate which, in turn, is uniformly distributed throughout the whey. A substantial portion of the thus-formed caseinate complexes with the whey through divalent calcium bridges. The resulting product A is an intricate network in which the calcium caseinate has been formed in a dispersed condition in the whey.

If calcium hydroxide were added simultaneously with or after the casein, a rapid reaction would occur between the casein and the readily available calcium ions at a high concentration to for an unmanageable gel. This rapid reaction is avoided by the order of steps 11 and 12.

Casein is added to the whey buffer complex to increase the protein content of the same from its normally low level to a level at which it would function in the manner of heat-treated nonfat milk as described hereinbefore. At a protein level of between 18 and 24%, based upon a powder with 4.0% water content, product A as a dough additive has been found to produce lower absorption and slightly more open grain and texture in a baked bread. For this purpose, about 6 to 12% of casein is mixed with the whey buffer complex based on total solids content. The protein content of product A may be further increased in two principal ways. As aforementioned the whey could be pretreated to a high protein form prior to treatment with calcium; or in the proportion of added casein may be increased. Since the amount of casein added in dry form is redried along with the rest of product A, in a relatively costly spray drying operation, it is economically advantageous to limit the amount of dry casein added at this step. furthermore, there is a practical maximum amount of dry casein (on the order of about 10–12% based upon total solids content) which may be added to a whey concentrate of the above solids content before the development of a highly viscous mixture which is difficult to process.

Conventional caseins, such as coagulated by rennet or acid, may be used according to the invention. Acids which may be employed for acid-precipitated caseins include hydrochloric, sulfuric, lactic and other food acids. An edible grade of acid-precipitated casein which has been thoroughly washed and dried is suitable. If used in powder form, the casein is preferably dried by spray-drying to produce a relatively fine particle size to assist dispersion. If another drying method (e.g., tray drying) is used, it is advantageous to comminute the dried product to improve dispersibility.

In step 13, product A, in slurry form, is dried to form powder (herein product B). It is preferred to spray dry product A in such a manner that a substantial portion of the lactose is in hydrate form to yield a substantially non-hygroscopic powder. One suitable technique is described in U.S. Pat. No. 2,088,606. Techniques of this type are generally performed by preliminary drying to a moisture content in the lactose on the order of 15% in a partially hydrated form with the lactose absorbing free water as it proceeds through the drier. Also, the lactose may be hydrated by crystallizing at relatively cool temperatures after concentrating the solids. In a less preferred drying method, the product may be dried in an anhydrous form which is hygroscopic and so tends to become sticky on exposure to moisture.

In step 14, product B is blended with an amount of sodium caseinate powder to form product C with a desired overall protein content. The sodium caseinate may be formed by reacting casein of the aforementioned conventional types with sodium hydroxide and drying the resultant caseinate. For example, a blended product C of 27% overall protein content is formed by mixing about 90% of powder B with 20% protein, and sodium caseinate. Since functional and nutritional equivalence to nonfat milk is the desired end product, it is generally not necessary to increase the overall protein content of the blend to above 35%, an average value of milk, but it could be increased to, say, 41%. To increase the protein content from 20% to 35%, about 20% of sodium caseinate is blended with 80% of product B.

In another embodiment of the invention, a method denoted by steps 11, 12 and 15 – 17 may be employed which differs from the foregoing method (steps 11–14) by the introduction of phosphate in step 15. The phosphate ion introduced into the dispersion of product A in step 15 is of sufficient quantity to form a product D with a pH of between 6.0 and 7.2. A preferred range of phosphate addition is between 0.20 and 0.50% baeed upon the total solids content. It is believed that the phosphate is incorporated into the network of product A to form phosphate bridges and calciumphosphate bridges between portions of the whey and caseinate in addition to the existing calcium bridges. The phosphate, substantially larger than calcium, expands the otherwise very compact complex, formed by calcium bridging alone, to a size more comparable to that of nonfat milk. Product D behaves like larger particles than the fine, tight particles of product A. Thus, product D is more similar in structure to the complex form of heat-treated nonfat milk as described hereinbefore than is product A and so is superior to the latter in its functioning as an additive in bread and cake mix. For example, by using the larger complex, product D, the net volume of products such as doughnuts is increased. Product D, like product A, may be used as an additive in slurry form or may be dried to use as in step 14.

In order to attain a pH value of from 6.5 to 6.8 in an approximation of nonfat milk, it is preferred to add the phosphate ions in the form of disodium phosphate. It should be noted that mono- or tri-sodium phosphate salts may be used, if necessary, to accommodate fluctuations in the pH of the dispersion caused, for example, by variations in the pH of the feed whey or casein. It is believed that the monovalent sodium ions form pendant groups on both the whey and caseinate serving to expand the complex structure which tends to become very compact due to multiple crosslinkages. Thus the sodium performs one similar function to the phosphate in eliminating a binding effect when added to certain mixes, such as doughnuts, which would decrease the net value of the resulting product.

It is important that most of the calcium is in the non-dissociated complex form prior to the addition of phosphate. Otherwise, highly insoluble calcium phosphate would precipitate in preference to forming bridges between the protein in whey and casein.

In step 16, product D is dried in the manner discussed regarding step 13 to form a dried product E and then, in step 17, product E is dry blended in the proportions and manner discussed regarding step 13 to form product F. A suitable product F includes 65% to 95% of product E dry blended with 5%–35% sodium caseinate to form a blend with an overall protein content of about 18–41%. The taste characteristics of product F are similar to the aforediscussed characteristics of product B.

It has been found that the flavor imparted by products C or F, even with as high as 20% sodium caseinate, is quite similar to that of nonfat milk. This is apparently because the "chalky" taste of the sodium in the caseinate salt form is masked by the nonfat milk taste of these products.

For use in products C or F, sodium caseinate, rather than other salts of casein, is preferred because it is more dispersible in water.

Product F has vastly superior functional characteristics to those of a dry blend of whey and sodium caseinate. In fact the blend with 35% protein is extremely close in function to nonfat milk for uses in doughnut mixes, bread, as an emulsifier in margarine, and in cake mixes. This indicates that it is only necessary for a certain minimum amount of the casein protein to be in complex form by means of the calcium or calcium-phosphate bridges in order to perform in the manner of nonfat milk. In other words, in a dry blend of whey and sodium caseinate, most of the protein is in the uncomplexed sodium salt form which does not function in the manner of milk casein.

In order to more clearly disclose the nature of the present invention, specific examples of the practice of the invention are hereinafter given. It should be understood, however, that this is done by way of example and is intended neither to delineate the scope of the invention nor limit the ambit of the appended claims. Parts are expressed in terms of parts by weight, unless otherwise expressed.

EXAMPLE 1

Nonfat milk was treated conventionally with rennet to precipitate casein which was separated for the formation of cheddar cheese. The remaining liquid, fluid whey, was heat-treated at 200°F for 15 seconds and then evaporated in two steps to a 40.5% total solids concentration. The intermediate concentrate was heated to 175°F and fed continuously to an evaporator discharging at 110°F and at the specified total solids. Thereafter, this concentrate was crystallized to a total solids concentration of 34%.

Calcium hydroxide in slurry form was then added and mixed into the partially crystallized 40% whey concentrate in a concentration of 0.79% based on the total whey solids. Thereafter, spray-dried casein powder was added to and thoroughly dispersed in the calcium-treated whey concentrate at a level of 12% casein based on total whey solids content, under vigorous agitation for ½ hour to provide homogeneity. The casein was of the grain curd, hydrochloric acid-precipitated type which was thoroughly washed in water prior to spray drying.

Thereafter di-sodium phosphate was added and dispersed into the concentrate at 0.29% based on the total whey solids content. The resulting product was fed to the dryer at 75°F operating with a dryer air outlet temperature of 120°–122°F providing an intermediate rough dry product with 14% moisture. The rough dry material readily slacked away from the dryer walls. Thereafter, the product was dried to a final moisture of 4.0% in a tray dryer and passed through a Reitz disintegrator with a 0.050 Comdore screen at 6000 to 7000 rpm. This powder was then filtered through a 62 mesh screen on a Sweco separation to provide the powder with a final particle size of the type designated hereinbefore as product E, and as "E" in Table 1.

EXAMPLE 2

The procedure of Example 1 was followed with different concentrations to form a 6.1% protein powder in a wet blend. The whey concentrate, containing a solids concentration of 30%, was mixed with 29% of the casein powder based on the total whey solids content. The final dried powder is designated as "$E_2$" in Table 1. This method requires a wetting of all of casein and subsequent spray-drying of the wetted casein. This adds significantly to the cost of the product and so should only be used when justified by the resulting functional characteristics.

EXAMPLES 3 – 5

Powder C was dry-blended with spray-dried sodium caseinate to form blend products of a type designated hereinbefore as product F and, in Table 1, $F_1 - F_3$ in the following proportions:

$F_1 = 90\%C + 10\%$ sodium caseinate
$F_2 = 79\%C + 21\%$ sodium caseinate
$F_3 = 83\%C + 17\%$ sodium caseinate Table 1 is a tabulation of the composition and properties of the aforementioned products compared to nonfat dry milk.

TABLE 1

PRODUCT COMPOSITION

|  | "$E_1$" | "$E_2$" | "$F_1$" | "$F_2$" | "$F_3$" | "NFDM" |
|---|---|---|---|---|---|---|
| Protein % | 20.0 | 36.1 | 27.0 | 35.0 | 32.0 | 35.9 |
| Lactose % | 63.6 | 49.5 | 58.0 | 51.0 | 55.0 | 52.3 |
| Fat % | 1.1 | 1.0 | 1.0 | 1.0 | 1.0 | 0.8 |
| Ash % | 8.02 | 7.56 | 7.60 | 6.7 | 6.9 | 8.0 |
| Moisture % | 5.0 | 3.6 | 5.3 | 5.0 | 5.2 | 3.0 |
| pH | 6.8 | 6.7 | 6.7 | 6.7 | 6.7 | 6.7 |
| Water Absorption % | 35 | 115 | 75 | 125 | 105 | 115 |

Since the cost of whey is substantially below that of casein, it is normally most economical to employ the minimum porportion of casein which will produce the desired functional and nutritional characteristics.

The powders of Table 1 were used as total substitutes for nonfat dry milk (NFDM) in the following products:

a. Cake topping mix — Powder $E_1$ additive yielded an excellent product.
b. Cake mix — Blends $F_1$ or $F_2$ additive produced a cake with no significant taste, body, or texture differences from NFDM.
c. Margarine — Blend $F_3$ additive yielded no apparent off-flavor.
d. Bread — Blends $F_2$ or $F_3$ as dough additives produced an excellent baked loaf comparable to one employing NFDM additive.
e. Doughnuts — Blend $F_{contrasted}$ as a mix additive produced a final doughnut low in fat absorption and of a volume comparable to a NFDM additive doughnut.

The foregoing results are to be constrasted with the same products in which a dry blend of whey and casein is used as a substitute for NFDM with the following results:

a. Cake topping mix — Flavor inappropriate to the product (e.g., cheesy) and a brown off-color resulted when baked.
b. Cake mix — Coarse grain, fragile and crumbly; extensive tunneling.
c. Margarine — Flavor inappropriate to the product (e.g., cheesy).
d. Bread — Loss of loaf volume, poor crust appearance, dark specks in crust--insoluble casein particles.
e. Doughnuts — High fat absorption, poor symmetry, poor volume.

It is apparent from the foregoing that a substitute has been provided for more expensive nonfat milk as an additive in a variety of products. The functional characteristics of the product of the present invention are substantially closer to those of nonfat milk than to the known so-called substitutes.

We claim:

1. In a method for forming a substitute for nonfat milk, the steps of mixing aqueous, edible whey with an amount of calcium hydroxide sufficient to form a whey buffer complex at a pH in excess of about 7.5 but less than 9.0 in which calcium is uniformly distributed in complex form capable of controlled release of dissociated calcium ions to yield a low concentration of said ions, and thereafter adding and dispersing in excess of about 6% but less than 29% casein based upon total solids content thoroughly into said whey buffer complex using agitation to form a homogeneous stable dispersion of calcium caseinate distributed throughout the whey.

2. A product produced according to the process of claim 1.

3. A method as in claim 1 wherein the stable dispersion is dried to form a powder.

4. A product produced according to the process of claim 3.

5. A method as in claim 1 in which said calcium hydroxide is mixed in an amount between 0.5% and 1.0% based on the total solids content.

6. A method as in claim 1 in which the whey is a concentrate with a solids content of 25% to 55%.

7. A method as in claim 1 in which between 0.05% and 0.5% of phosphate ion is added based on total solids content.

8. A product produced according to the process of claim 7.

9. A method as in claim 7 in which the phosphate is a sodium salt.

10. A method as in claim 7 in which casein has been added in a dry powder form.

11. A method as in claim 7 in which said phosphate-treated whey-caseinate dispersion is dried to form a powder with functional characteristics similar to that of nonfat dry milk.

12. A product produced according to the process of claim 11.

13. A method as in claim 9 in which the pH is adjusted by mixing a predetermined amount of disodium phosphate with the whey-caseinate dispersion.

14. A method as in claim 11 in which a substantial portion of the lactose content of said powder is dried in hydrate form.

15. A method as in claim 11 in which said powder is homogeneously blended with dry particles of alkali metal caseinate salt to form a product with a high protein content.

16. A method as in claim 15 in which the alkali metal is sodium.

17. A product produced according to the process of claim 16.

18. A method as in claim 15 in which said powder includes from 18% to 35% protein and in which sodium caseinate is blended in a proportion such that the overall protein content of said blend is from 18% to 41%.

19. A product produced according to the process of claim 18.

20. A method as in claim 18 in which between 72% and 99% of said base product is blended with between 1% and 28% of sodium caseinate.

* * * * *